United States Patent
Rus et al.

(10) Patent No.: US 10,864,833 B2
(45) Date of Patent: Dec. 15, 2020

(54) RIGID CARPET VEHICLE SEAT BACKER ARRANGEMENT AND VEHICLE SEAT WITH RIGID CARPET SEAT BACKER ARRANGEMENT

(71) Applicant: Adient Engineering and IP GmbH, Burscheid (DE)

(72) Inventors: Liviu Rus, Bloomfield Hills, MI (US); Dorel Baciu, Rochester Hills, MI (US); Gregory Steinke, Brighton, MI (US); Matt Romak, Gibraltar, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 84 days.

(21) Appl. No.: 16/263,423

(22) Filed: Jan. 31, 2019

(65) Prior Publication Data

US 2019/0248257 A1    Aug. 15, 2019

Related U.S. Application Data (60) Provisional application No. 62/628,479, filed on Feb. 9, 2018.

(51) Int. Cl.
| | |
|---|---|
| *B60N 2/58* | (2006.01) |
| *B60N 2/68* | (2006.01) |
| *B60N 3/04* | (2006.01) |
| *B60N 2/60* | (2006.01) |
| *B60N 2/30* | (2006.01) |
| *B60N 2/36* | (2006.01) |

(52) U.S. Cl.
CPC ......... *B60N 2/5825* (2013.01); *B60N 2/5891* (2013.01); *B60N 2/6009* (2013.01); *B60N 2/686* (2013.01); *B60N 3/046* (2013.01); *B60N 2/3011* (2013.01); *B60N 2002/363* (2013.01)

(58) Field of Classification Search
CPC .... B60N 2/5825; B60N 2/5891; B60N 2/686; B60N 2/6009; B60N 2/3011; B60N 3/046; B60N 2002/363
USPC .......................................................... 296/63
See application file for complete search history.

(56) References Cited

U.S. PATENT DOCUMENTS

| | | | | |
|---|---|---|---|---|
| 6,962,382 | B2* | 11/2005 | Scarlett ................. | B60R 21/026 296/24.42 |
| 7,243,998 | B2* | 7/2007 | Fourrey ............ | B29C 45/14631 297/452.12 |
| 9,463,727 | B2* | 10/2016 | Styn ..................... | B60N 2/6009 |

* cited by examiner

*Primary Examiner* — Joseph D. Pape
*Assistant Examiner* — Dana D Ivey
(74) *Attorney, Agent, or Firm* — Marshall & Melhorn, LLC (57) ABSTRACT

A vehicle seat carpet backer assembly includes a carpet piece and resin/fiber material joined and molded to form a resin/fiber backer panel of a defined shape. A flexible toe-kick portion is provided a seamless transition between the upper carpet portion of the resin/fiber, upper carpet, panel portion and the lower carpet portion of the flexible toe-kick portion. A method includes providing a carpet piece cut to a size and shape and a sized resin/fiber panel material. The resin/fiber panel material is heated and placed with a top section of the carpet in a molding press to fuse them together. A shaped assembly is then formed with flanges which are inserted in channels of a seat. A polypropylene reinforcement sheet is attached to a lower section of the carpet that was not subjected to the molding press. Elastic bands are sewn to the lower edge of the backer assembly.

20 Claims, 10 Drawing Sheets

RIGID CARPET VEHICLE SEAT BACKER ARRANGEMENT AND VEHICLE SEAT WITH RIGID CARPET SEAT BACKER ARRANGEMENT

CROSS REFERENCE TO RELATED APPLICATIONS

This application claims the benefit of priority of U.S. Provisional Patent Application 62/628,479, filed Feb. 9, 2018, the entire contents of which are incorporated herein by reference.

TECHNICAL FIELD

The present invention relates to vehicle seats in general and more particularly relates to a vehicle seat backer which covers a back (rear side) of the vehicle seat.

TECHNICAL BACKGROUND

Vehicle seats may be provided as vehicle rear seats which may be folded forward. This folding forward may provide access to a trunk or cargo area. Folding a vehicle seat forward may also extend the spatial region of the trunk or cargo area. Such a vehicle seat may be provided with a backer or cover. It may be advantageous to form at least a portion of the backer or cover with carpet. This carpet may be carpet that matches carpet in a trunk or cargo area. Further, vehicle seats in general may have a back surface (rear surface) which need not have a covering which exactly matches other surface portions of the vehicle seat. It may be advantageous to provide the seat back such that the rear surface is covered with carpet material. However, a transition from the trim, that covers other portions of the vehicle seat to such a carpet backer presents complications during assembly. Further, working with carpet material can be problematic due in part to the flexibility of the carpet material and the need to position, fit and fix the carpet material to the vehicle seat.

SUMMARY

It is an object of the invention to provide a seat backer arrangement with at least a rigid portion which can be effectively and easily be joined to the backside (rear side) of a vehicle seat frame and which preferably includes carpet forming the back surface of the vehicle seat.

It is a further object of the invention to provide a seamless integration of a rigid molded carpet with a flexible toe-kick cover for the back of a vehicle rear seat. In particular, it is an object to provide a second row molded carpet back panel with integrated toe-kick.

It is a further object of the invention to provide a carpet vehicle seat backer with carpet material at an outer face of the backer, which carpet material is supported by a backer panel that can be easily assembled with the backer panel and/or frame of a seat back and which has an at least semi seamless transition between backer panel and a lower portion of the carpet material that forms a flexible toe-kick.

According to the invention, a vehicle seat carpet backer assembly is provided comprising a carpet piece with a predefined carpet perimeter contour and comprising an upper carpet portion and a lower carpet portion and a resin/fiber material. The upper carpet portion and the resin/fiber material are joined and molded to form a resin/fiber, upper carpet, panel portion of a defined shape. The lower carpet portion is not joined with the resin/fiber material and forms a flexible toe-kick portion with a seamless transition between the upper carpet portion of the resin/fiber, upper carpet, panel portion and the lower carpet portion of the flexible toe-kick portion. The resin/fiber, upper carpet, panel portion of the defined shape is formed by at least partially heating the resin/fiber material and molding at least a portion of the heated resin/fiber material together with the upper carpet portion to press together and fuse together at least a portion of the heated resin/fiber material and the upper carpet portion.

The resin/fiber, upper carpet, panel portion may advantageously include a rigid, or an at least semi ridged, back panel surface and a rigid, or an at least semi ridged, outer flange extending along at least a portion of an outer perimeter of the back panel surface and extending away from the back panel surface.

The vehicle seat carpet backer assembly may further comprise a flexible carpet reinforcement, wherein the flexible carpet reinforcement is connected to the lower carpet portion to form a reinforcement backing for the flexible toe-kick portion. The flexible carpet reinforcement may advantageously comprise polypropylene reinforcement material sewn to an inner surface of the lower carpet portion. Edges of the lower carpet portion may advantageously be hemmed over the flexible carpet reinforcement to provide a hemmed over portion sewn to the flexible carpet reinforcement and sewn to a front side of the carpet piece.

The vehicle seat carpet backer assembly may further comprise elastic bands sewn to a lower edge of flexible lower carpet portion.

The vehicle seat carpet backer assembly may further comprise push pins fixed adjacent to a lower edge of the resin/fiber material. The lower edge of the resin/fiber material may advantageously not be fused to the upper carpet portion in a region of the push pins, whereby the not fused resin/fiber material forms a backing material free edge.

The vehicle seat carpet backer assembly may further comprise a flange element staked to a lower edge of the resin/fiber material.

According to a further aspect of the invention, a vehicle seat is provided comprising a vehicle seat back frame and/or back panel and a carpet backer assembly comprising a carpet piece with a predefined carpet perimeter contour and comprising an upper carpet portion and a lower carpet portion and a resin/fiber material. The upper carpet portion and the resin/fiber material are joined and molded to form a resin/fiber, upper carpet, panel portion of a defined shape. The lower carpet portion is not joined with the resin/fiber material and forms a flexible toe-kick portion with a seamless transition between the upper carpet portion of the resin/fiber, upper carpet, panel portion and the lower carpet portion of the flexible toe-kick portion. The resin/fiber, upper carpet, panel portion of the defined shape is formed by at least partially heating the resin/fiber material and molding at least a portion of the heated resin/fiber material together with the upper carpet portion to press together and fuse together at least a portion of the heated resin/fiber material and the upper carpet portion.

The vehicle seat back frame and/or back panel may advantageously comprise a peripheral channel. The resin/fiber, upper carpet, panel portion may advantageously include an at least semi ridged back panel surface and an at least semi ridged outer flange extending along at least a portion of an outer perimeter of the back panel surface and extending away from the back panel surface. The peripheral channel may receive the rigid outer flange to position the vehicle seat carpet seat backer assembly relative to the vehicle seat back frame and/or back panel.

Push pins may advantageously be fixed adjacent to a lower edge of the resin/fiber material. The vehicle seat back frame and/or back panel may advantageously include push pin openings receiving the push pins fixed adjacent to a lower edge of the resin/fiber backer panel.

According is provided for forming a carpet seat backer assembly and/or for forming a vehicle seat. The method comprises the steps of providing a carpet piece having a predetermined size and shape and providing a resin/fiber panel material having a predetermined size and shape. At least a portion of the resin/fiber backer panel material is heated. At least an upper carpet portion of the carpet piece along with at least a portion of the heated resin/fiber panel material is placed in a molding press and, with the molding press, the heated resin/fiber panel material is pressed to a backside of the carpet piece to form a resin/fiber, upper carpet, panel portion of a defined shape. The resin/fiber, upper carpet, panel portion is subsequently removed from the molding press.

The molding press includes a molding tool, which form the resin/fiber, upper carpet, panel portion with a back panel surface and a rigid outer flange extending along at least a portion of an outer perimeter of the resin/fiber, upper carpet, panel portion and extending away from the back panel surface.

A lower carpet portion of the carpet piece may not be placed in the molding press such that the lower carpet portion is flexible and is not fused to the resin/fiber material and further comprising the step of providing a flexible carpet reinforcement and attaching the flexible carpet reinforcement to the lower carpet portion to form reinforced flexible lower carpet portion.

The flexible carpet reinforcement may comprise polypropylene reinforcement material fixed to an inner surface of the carpet piece and further comprising hemming edges of the lower carpet portion over the backing to form a hemmed over portion that is sewn to the backing and to a front side of the carpet piece.

The method may advantageously further comprise the step of providing a flange element staked to a lower edge of the resin/fiber material. Further, elastic bands may be provided and may be sewn to a lower edge of flexible lower carpet portion.

The method may advantageously further comprise the steps of providing a vehicle seat back frame and/or back panel comprising a peripheral channel. The rigid outer flange may be placed in the peripheral channel extending along at least a portion of an outer perimeter of the resin/fiber, upper carpet, panel portion to position the vehicle seat carpet seat backer assembly relative to the vehicle seat back frame and/or back panel.

The lower edge of the resin/fiber material may not be fused to the upper carpet portion, whereby a backing material free edge is formed. Push pins may be fixed to the backing material free edge. The vehicle seat back frame and/or back panel may be provided with push pin openings. The push pins may be pushed into the push pin openings.

The assembly is executed by placing a piece of automotive carpet, along with backing, in a molding press. An extension of the carpet is allowed to exit the tool. After molding, a reinforcement is added to the carpet extension and the edges are hemmed. Elastic bands are added to the flexible toe-kick for attachment to seat structure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
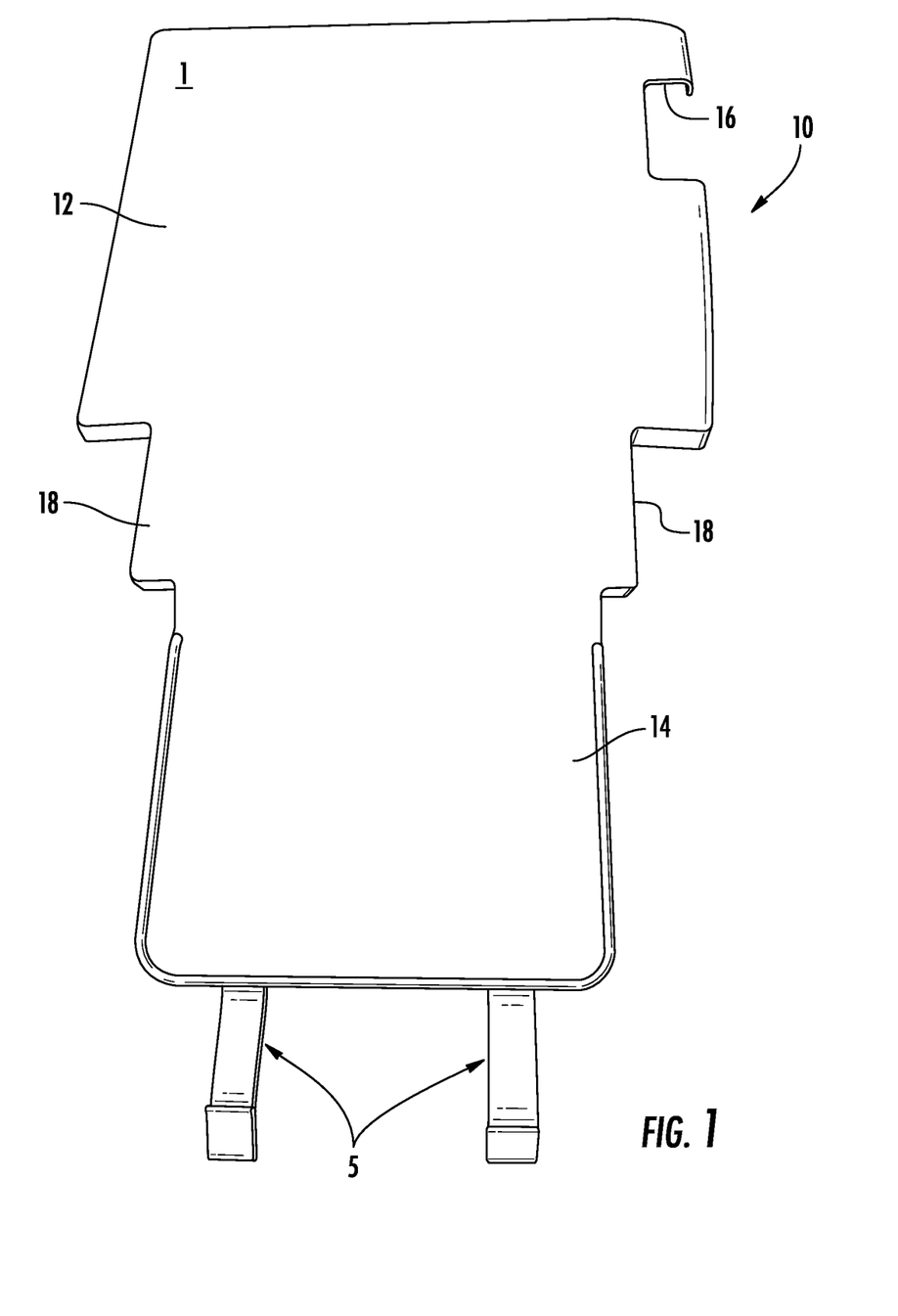
FIG. 1 is a perspective view showing an outer surface of a vehicle seat backer assembly according to an embodiment of the invention.
Figure 8:
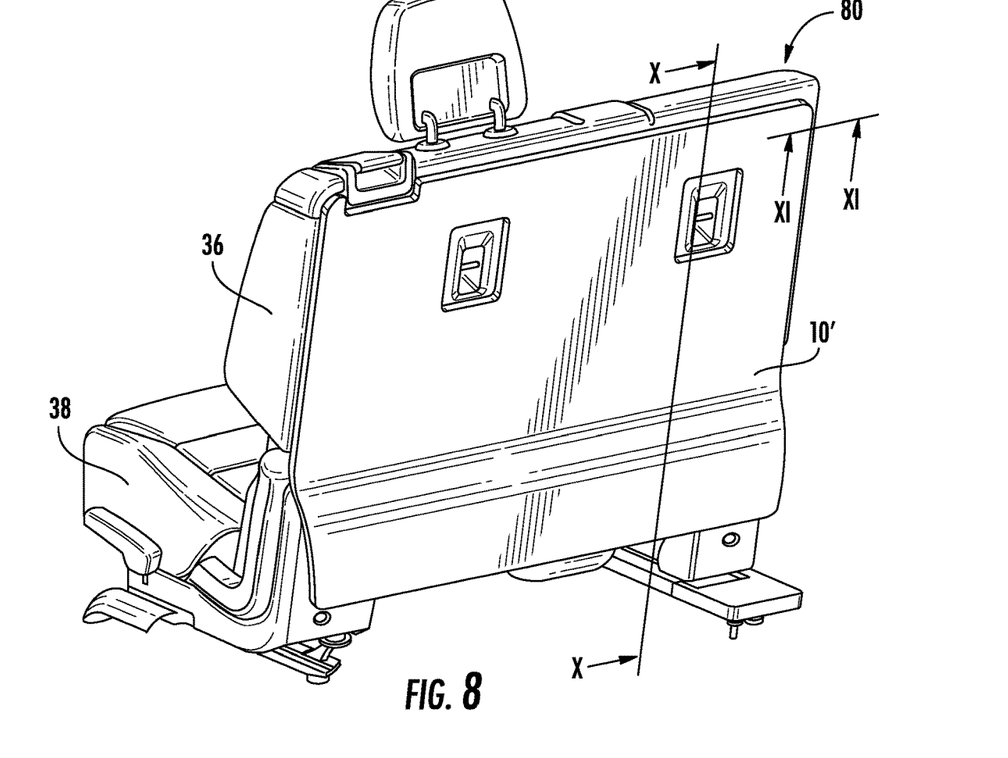
FIG. 8 is a perspective view showing a vehicle seat with a vehicle seat backer assembly according to the invention.

Referring to the drawings, FIG. 1 shows a front side of a vehicle seat backer assembly generally designated 10. The backer assembly 10 includes an upper portion 12 as well as a lower toe-kick portion 14. FIG. 1 shows the outer (rear facing) surface of the seat backer assembly 10. This outer surface is provided with carpet 1, such as automotive carpet. This automotive carpet 1 may be for example Eudora—19 ounce automotive carpet. A resin/fiber panel material is heated and press molded with the automotive carpet 1, to fuse the heated resin/fiber material to at least the upper carpet portion 12 to form a resin/fiber, upper carpet, panel portion 2. The resin/fiber, upper carpet, panel portion 2 is formed of a composite resin/fiber material based on a blend of polypropylene and fiberglass (such as sold by AZDEL Inc.). The carpet piece 1 is cut to have a predefined carpet perimeter contour with the upper carpet portion 12 and the lower carpet portion 14. The upper portion 12 is configured to cover the back of the vehicle rear seat generally designated 80 (FIG. 8). The seat backer assembly 10 is shaped to correspond to the rear support structure or back panel 82 of the vehicle seat 80. The outer contour of the seat backer assembly 10 is adapted to the vehicle seat 80. The contour includes a contour portion 16 to accommodate an actuating lever and/or locking interface. Further contours 18 are provided to accommodate the shape of the rear support structure or back panel 82, which may include pivot fixtures and/or brackets of the vehicle seat 80. The resin/fiber, upper carpet, panel portion 2 with the upper carpet portion 12 is essentially rigid (rigid/semi rigid). The lower portion 14 is not a part of the resin/fiber, upper carpet, panel portion 2 and is flexible based at least in part on the flexible nature of the carpet. Elastic straps 5 are fastened to the lower portion 14.

Figure 2:
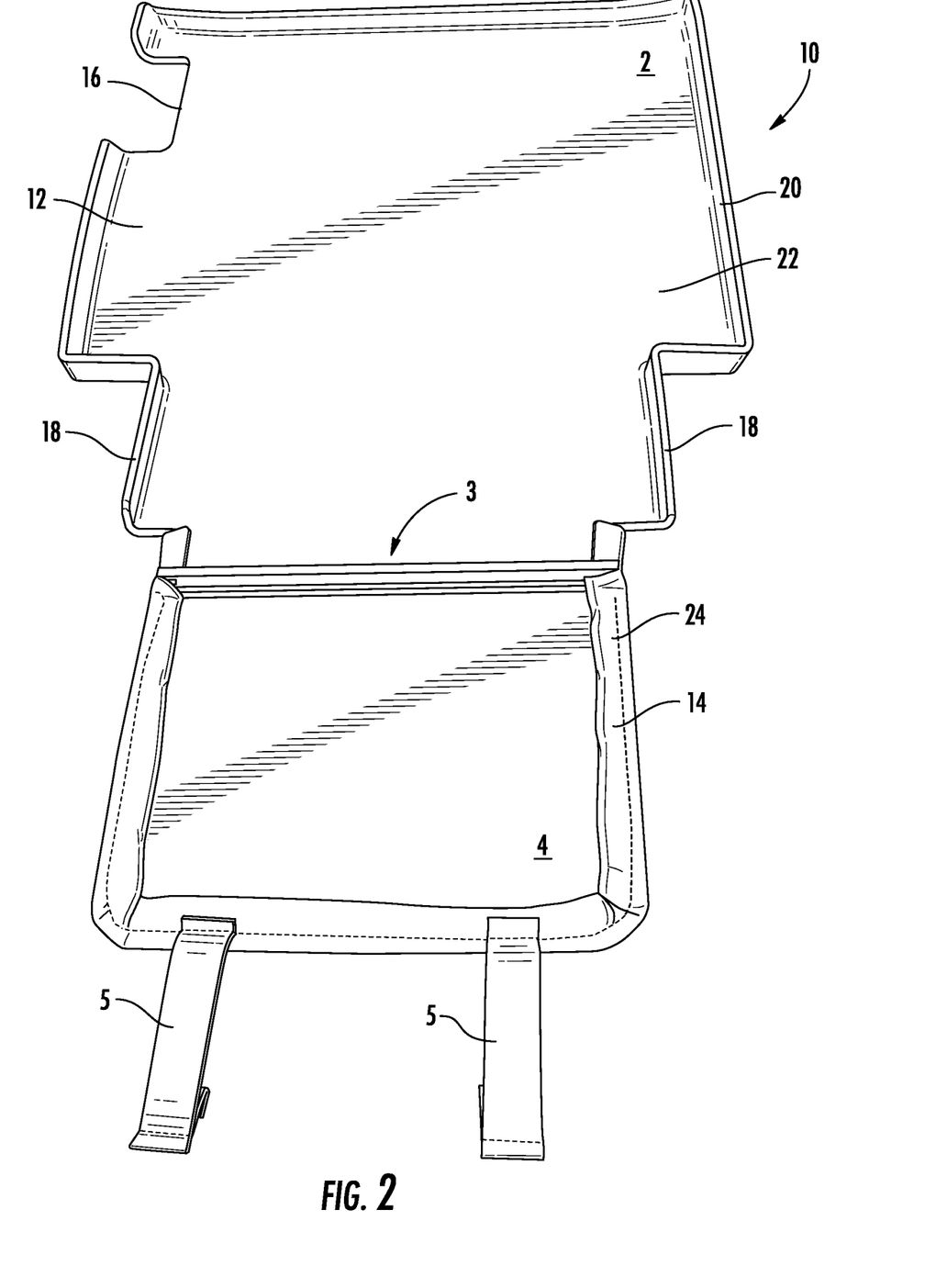
FIG. 2 is a perspective view showing an inner surface of the vehicle seat backer assembly according to FIG. 1.

FIG. 2 shows an inner side of the vehicle seat back assembly 10. The inner side faces toward and is applied to a seat back 36 of a vehicle seat 80 as described below. The inner side of the resin/fiber, upper carpet, panel portion 2, with upper carpet portion 12, is comprised of the resin/fiber material. This resin/fiber material is press molded with the upper carpet portion 12 of the carpet piece 1 to fuse the upper carpet portion 12 of the carpet piece 1 to the resin/fiber material and the form the resin/fiber, upper carpet, panel portion 2 with the integral upper carpet portion 12, as described below. At the inner side, the resin/fiber, upper carpet, panel portion 2 with the upper carpet portion 12 has a perimeter with a perimeter flange 20 around a backer panel surface 22. The flange 20 is rigid and is essentially at an almost 90° angle relative to the back panel surface 22 of the resin/fiber, upper carpet, panel portion 2. This configuration allows the upper carpet portion 12 to be mounted to a seat back frame 84/back panel 82 with the flange 20 inserted into a U-channel 88 on the seat back frame 84/back panel 82. At a lower edge of the upper carpet portion 12, a flange 3 is staked to the resin/fiber, upper carpet, panel portion 2 to facilitate fixation of the backer assembly 10 to the vehicle seat 80.

At the inner side of the seat backer assembly 10, the lower carpet portion 14 includes a polypropylene reinforcement material 4, backing the lower carpet portion of the carpet 1. The reinforcement material 4 is at least somewhat flexible. The reinforcement material 4 is adhered to the lower carpet portion 14 of the carpet 1. Edges of the lower carpet portion 14 of the carpet 1 are hemmed over the reinforcement 4 to form hemmed over carpet edges 24. A hem sewing operation stitches the folded over hem portion to the reinforcement 4 and to the front side of the carpet piece 1. The elastic bands 5 are sewn to the lower edge of the assembly 10.

Figure 3:
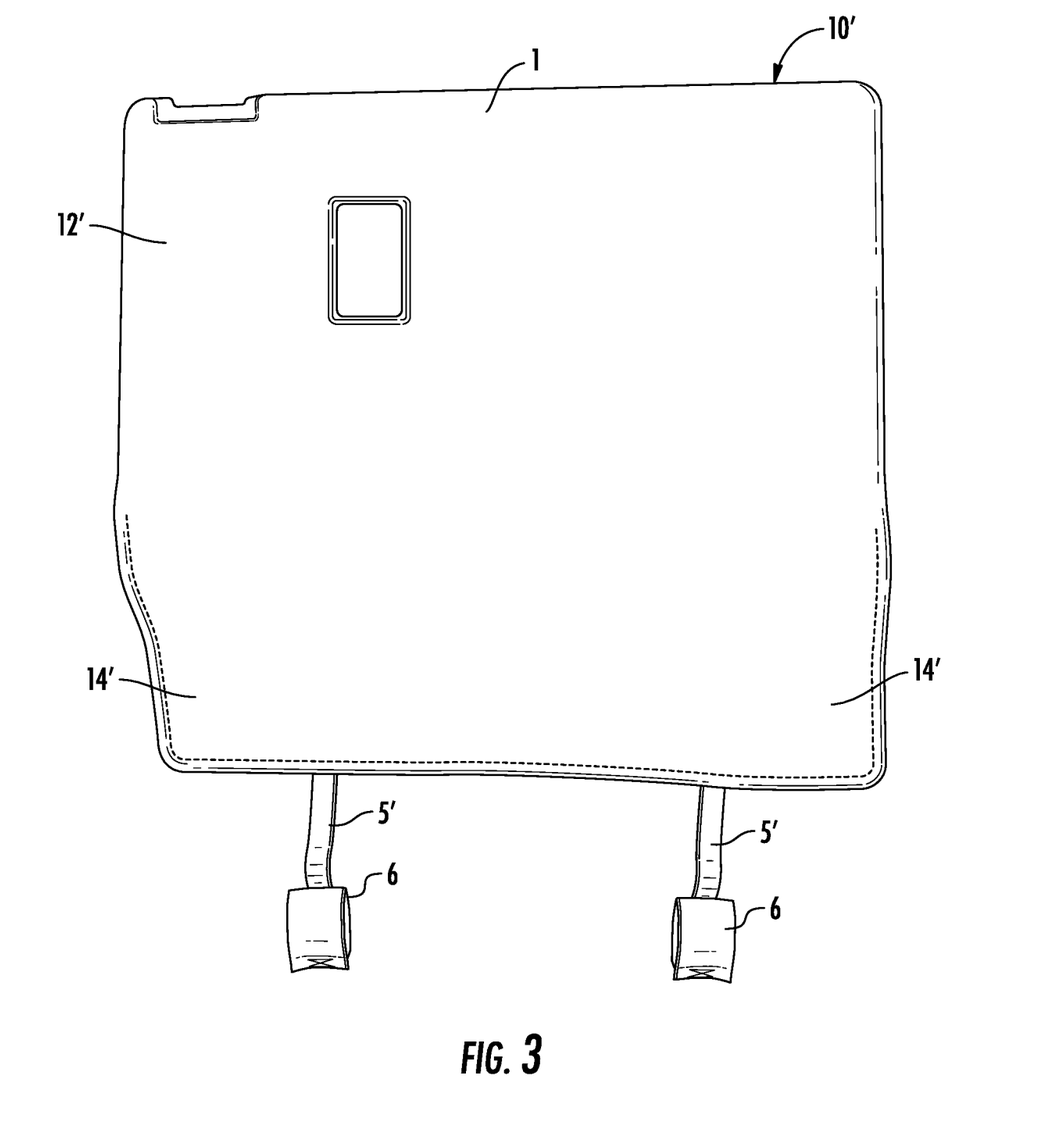
FIG. 3 is a perspective view showing an outer surface of a vehicle seat backer assembly according to another embodiment of the invention.

FIG. 3 shows a front side of a vehicle seat backer assembly generally designated 10' according to another embodiment of the invention. The backer assembly 10' includes an upper carpet portion 12' with resin/fiber, upper carpet, panel portion 2' as well as a lower toe-kick portion 14'. FIG. 3 shows the outer (rear facing) surface of the seat backer assembly 10'. This outer surface is provided with carpet such as Eudora—19 ounce automotive carpet 1. A portion of the resin/fiber material is fused to an upper portion of the carpet 1 to form the rigid or at least semi-rigid resin/fiber, upper carpet, panel portion 2' with the upper carpet portion 12'. The resin/fiber panel material of the resin/fiber, upper carpet, panel portion 2' is a composite, based on a blend of polypropylene and fiberglass (such as sold by AZDEL Inc.). The carpet piece 1 is cut to a predefined carpet perimeter contour with the upper carpet portion 12' and the lower carpet portion 14'. The upper carpet portion 12' is configured to be a part of the resin/fiber, upper carpet, panel portion 2' and to cover the back of the vehicle rear seat 80. The seat backer assembly 10' is shaped to correspond to the rear support structure 82 of the vehicle seat 80. The outer contour of the seat backer assembly 10' is adapted to the vehicle seat 80 and includes a contour portion 16 to accommodate an actuating lever and/or locking interface (FIG. 8). A cut out opening 19 is provided to accommodate a child seat top tether anchor, that is provided at the frame 84 and/or the back panel 82 of the vehicle seat 80. The resin/fiber, upper carpet, panel portion 2' with the upper carpet portion 12' is essentially rigid. The lower portion 14' is not backed by the cured resin/fiber panel material (is not a part of the resin/fiber, upper carpet, panel portion 2') and is flexible—more flexible than the upper carpet portion 12' that is a part of the resin/fiber, upper carpet, panel portion 2'. Elastic straps 5', with cuff ends 6, are sewn to the lower portion 14' to fasten each of the elastic straps to the lower portion 14'.

Figure 4:
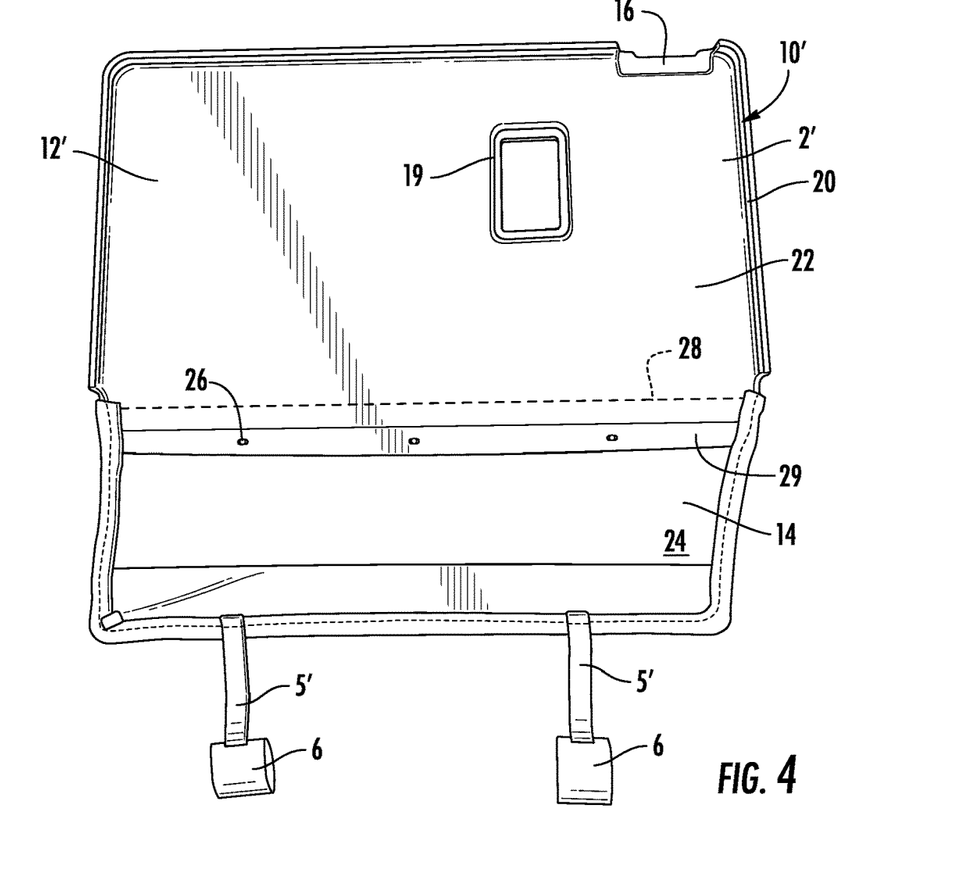
FIG. 4 is a perspective view showing an inner surface of the vehicle seat backer assembly according to the embodiment of FIG. 3.

FIG. 4 shows an inner side of the vehicle seat back assembly 10'. The inner side faces and is applied to the back panel 82 and/or seatback frame 84 of a seat back 36 of the vehicle seat 80 as described below. The inner side of the resin/fiber, upper carpet, panel portion 2' is comprised of the resin/fiber panel material at a back side of the upper carpet portion 12'. This resin/fiber panel material is press molded with the carpet piece 1 to form the inner side of the resin/fiber, upper carpet, panel portion 2', as described below. At the inner side, the resin/fiber, upper carpet, panel portion 2' has a perimeter with a perimeter flange 20 around a backer panel surface 22. The flange 20 is rigid and is essentially at an almost 90° angle relative to the back panel surface 22 of the resin/fiber, upper carpet, panel portion 2'. This configuration allows the upper portion 12 to be mounted to a seat back frame with the flange is 20 inserted into the U-channel(s) 88 on the back panel 82 of the seat back of vehicle seat 80. At a lower edge of the upper carpet portion 12', push pins 26 are connected to and supported by the resin/fiber panel material. In particular, instead of the flange 3 for supporting a connection of the backer assembly 10' to the vehicle seat 80, the embodiment of FIGS. 3-6B includes the push pins 26 to provide a connection of the backer assembly 10' to the vehicle seat 80. The push pins 26 help keep the carpet 1 and resin/fiber panel material attached across the bottom portion to the back frame 82 such that in a side view of the seat there is no gap between the carpet 1 and back frame 82, especially with the vehicle seat 80 in the design position, in which the tension on the carpet 1 is not that great. The configuration also helps to prevent BSR (buzz, squeak and rattle). The embodiment of FIGS. 3-6B also differs from the embodiment of FIGS. 1-2 in that the resin/fiber, upper carpet, panel portion 2' has extending resin/fiber material that is a free portion 29 that is not fused to the carpet 1 in a region of the push pins 26. The adhesion (fusing) of the resin/fiber panel material to the carpet 1 ends at the line 28 shown in FIG. 4. This free portion 29 of the resin/fiber panel material can be moved relative to the carpet 1 (in practice the lower portion of the carpet 1 is moved to gain access to the free portion 29—FIG. 12), allowing the push pins to be oriented for manipulating (pushing) the push pins during mounting of the backer 10' on the vehicle seat 80.

Figure 5:
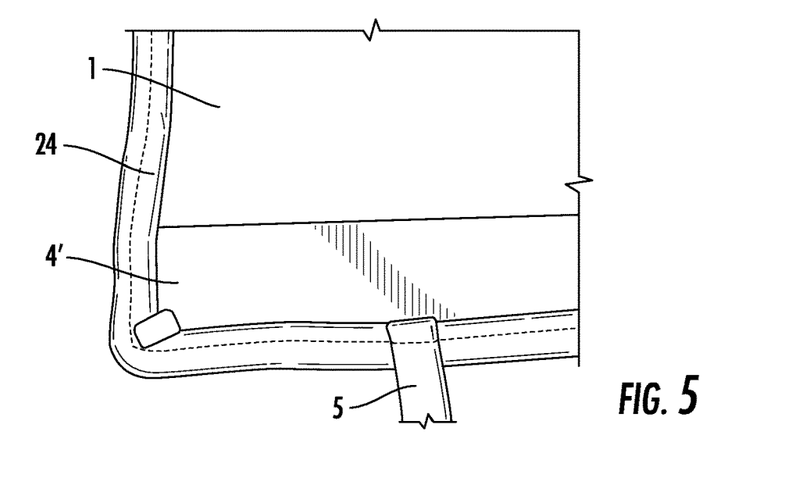
FIG. 5 is an enlarged view of a region of a toe-kick portion of the inner surface of the carpet vehicle seat backer according to FIG. 3.
Figure 9:
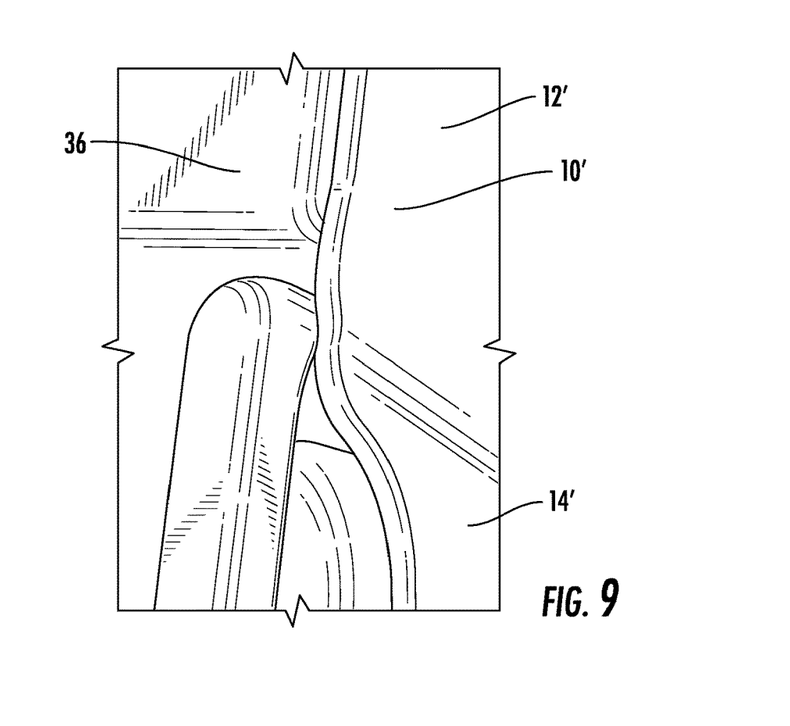
FIG. 9 is an enlarged perspective view showing a detail from FIG. 8.

At the inner side of the seat backer assembly 10, the lower portion 14 includes a polypropylene reinforcement material 4' backing (reinforcing) the carpet 1. The reinforcement material 4' is somewhat flexible. The embodiment of FIGS. 3-6B also differs from the embodiment of FIGS. 1-2 in that the reinforcement material 4' is sewn to the lower portion 14' of the carpet 1. Edges of the carpet 1 at the lower portion 14' are hemmed over the reinforcement 4' to form hem 8'. As can be seen in FIG. 5, the hem 24 extends beyond an upper extent of the reinforcement material 4'. The reinforcement material 4', for example a 2 mm thick polypro panel, is only sewn in and no bonding (no adhesive) is required. This polypro panel reinforcement 4' needs to have some flexibility as the reinforcement 4' bends around the bottom of the seat back of the vehicle seat 80 and around the back of the cushion (seat base) of the vehicle seat 80 to have a clean close out of the seat during a seat back (back rest) folding process (FIGS. 8 and 9). The hem sewing operation stitches the folded over hem portion 24 to the reinforcement 4' and to the front side of the carpet piece 1. The elastic bands 5' are sewn to the lower edge of the backer assembly 10'.

Figure 6A:
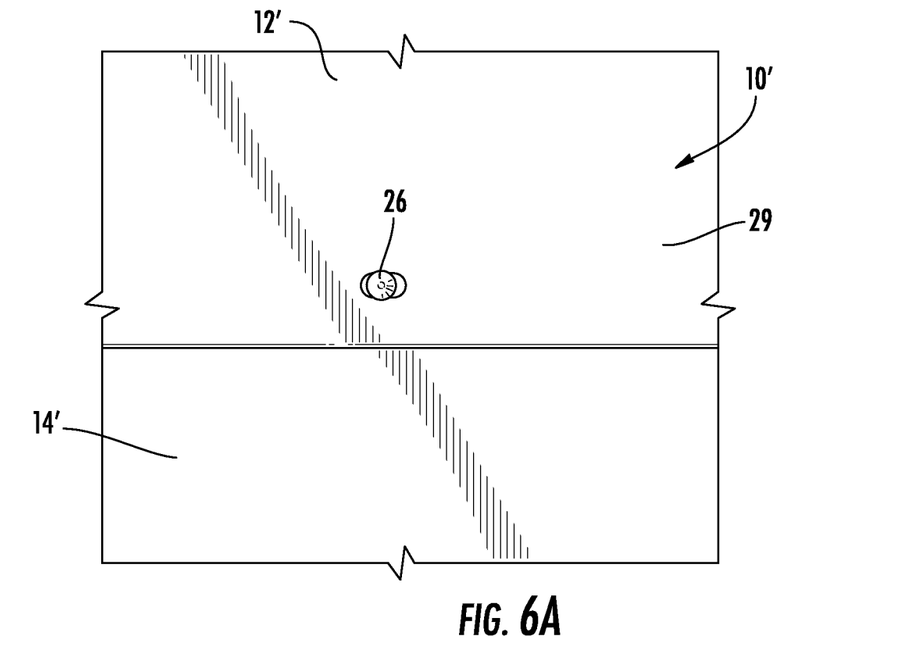
FIG. 6A is an enlarged view of the inner surface of the carpet vehicle seat backer according to FIG. 3, showing a transition region between the rigid panel and the toe-kick portion in the region of a vehicle seat pushpin.
Figure 6B:
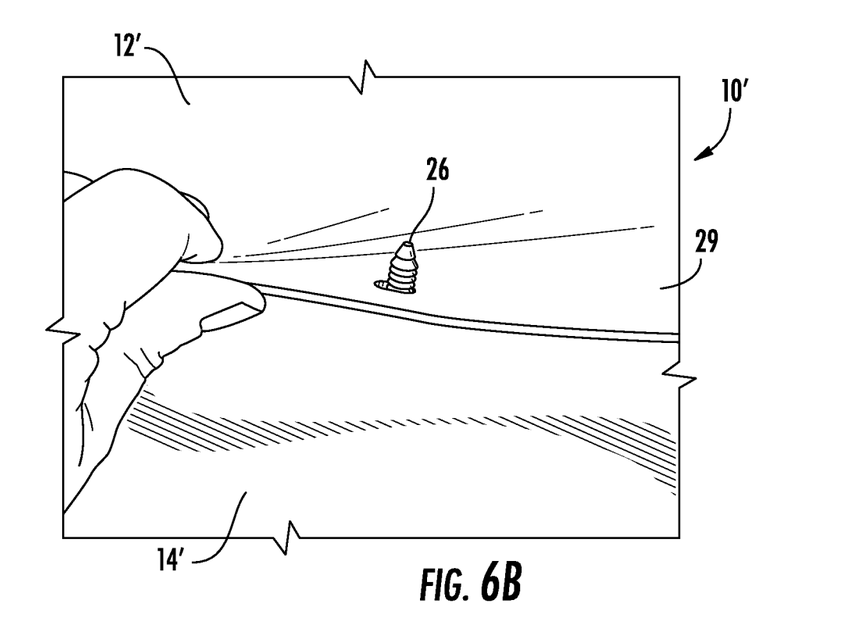
FIG. 6B is an enlarged view showing the lifting up of a free portion of the resin/fiber material at the transition region shown in FIG. 6A.

FIG. 6A shows an enlarged view of the resin/fiber, upper carpet, panel portion 2 and the extending carpet 1, at the interface between the upper portion 12' and the lower portion 14'. At this interface the rigid resin/fiber is not fused to the carpet 1 along the relatively narrow free portion strip 29. This free portion 29 can be lifted relative to the carpet 1 (and/or the carpet 1 can be lifted relative to the free portion 29), allowing the push pins 26 to be pushed into the back panel 82 of the vehicle seat 80. As can be seen in FIG. 6B, the free portion 29 can be lifted to allow access to press the push pins 26 during the mounting of the backer assembly 10' to the vehicle seat 80.

Figure 7A:
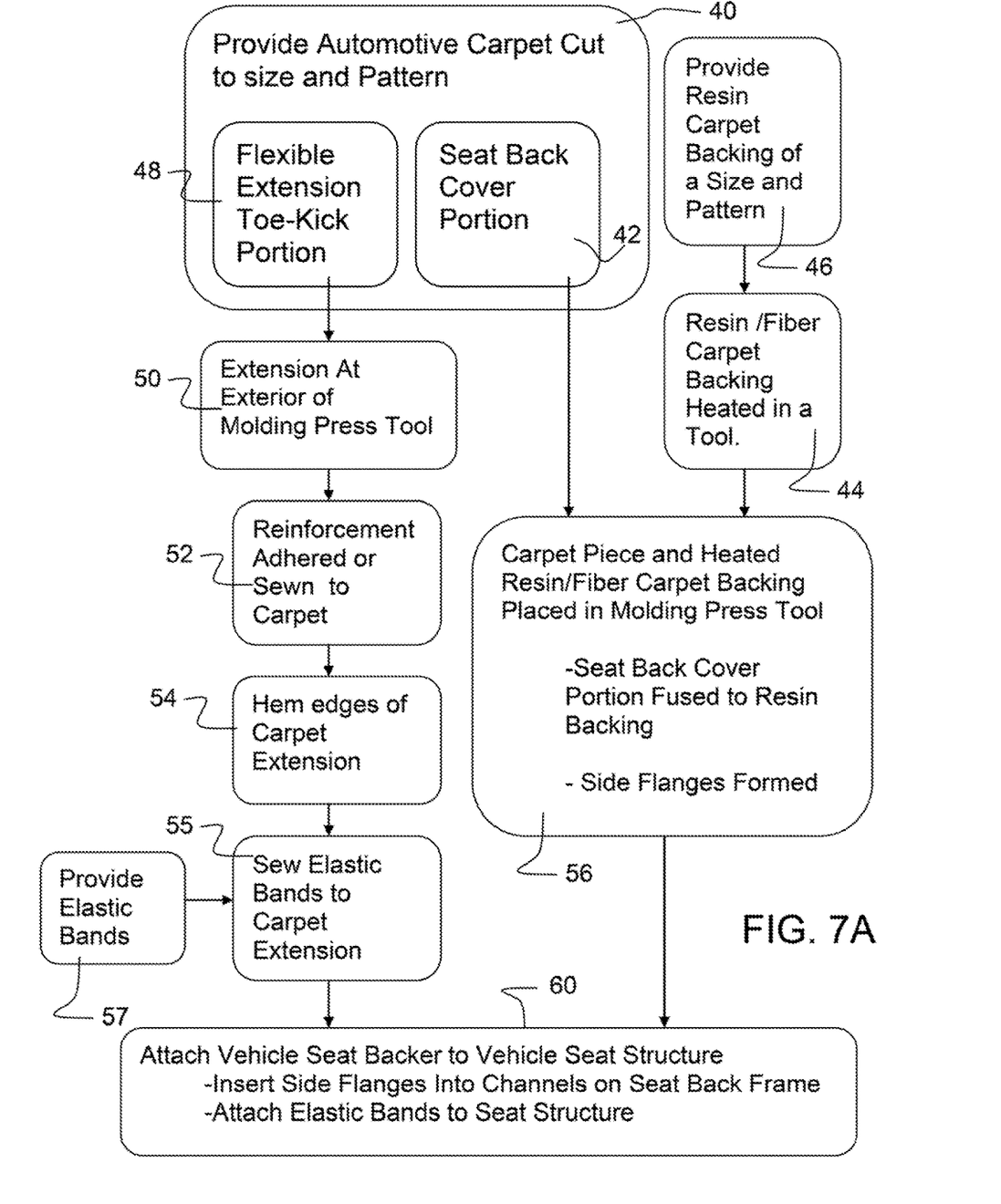
FIG. 7A is a flow diagram showing aspects of the method of forming a vehicle seat backer assembly according to an embodiment of the invention.

FIG. 7A is a schematic flow diagram showing aspects of the method of forming the backer assembly 10. The method essentially includes cutting the carpet and the resin/fiber panel material to a specified size/pattern. The resin/fiber panel material of the predetermined shape and size is heated to a specified temperature. A forming tool (molding press tool) is opened and at least a portion of the carpet 1 and at least a portion of the heated resin/fiber panel material are loaded into the molding press tool. The molding press tool closes to join (fuse) the heated resin/fiber panel material to the carpet 1 and form the joined composite into the desired shape of the backer assembly 10.

As indicated at step 40 the cut to size automotive carpet piece 1 is provided. The automotive carpet piece 1 is cut to a predetermined size and shape based on the seat 80 that is to be covered. This shape conforms to a predetermined shape of a molding press tool 34, so as to provide the contour features 16, 18 and to form the flange 20 extending about the back panel surface 22, as discussed above. The cut automotive carpet piece 1 includes a seat back cover portion or upper portion 12 and the carpet extension/lower portion/toe-kick portion 14. As indicated at step 42, the cover portion or upper portion 12 of the carpet piece 1 is placed in a molding press tool of a molding press. The resin/fiber panel material is formed or cut to a size and shape at step 46. Although other material can be used, such as semi cured and cured resin fiber composites, Azdel resin/fiber panel material (from Hanwha Azdel Inc.) was advantageously used to form the resin/fiber, upper carpet, panel portion 2'. At step 44, the provided resin/fiber panel material is heated and is provided and fed to the molding press tool as indicated at step 56. The molding press tool is closed with the cover portion/upper portion 12 and with the resin/fiber panel material in the mold press. The carpet extension or lower portion 14 are outside of the in the mold press 30, as indicated at step 50. Step 56 further includes the mold press tool applying pressure. This results in the heated resin/fiber panel material and the carpet 1 being fused together with the imparted shape to provide the flange 20 and the back panel surface 22. The carpet resin/fiber backing material and the cover form the backer assembly 10 with the backer panel 2 with the fused carpet 1. The molding press tool is shaped so as to form the side or peripheral flange 20 during the pressure molding. The peripheral flange 20 is comprised of carpet 1 backed by resin/fiber panel material.

As indicated at step 48 the flexible extension portion (lower portion) 14 is provided. Step 50 includes positioning the flexible extension portion (lower portion) 14 outside of the mold press. That is, the flexible extension portion (lower portion) 14 extends out of the molding press during the molding procedure indicated by step 56. Preferably after the molding, the reinforcement material 4 is glued, sewn or otherwise fixed/adhered to the lower portion 14 of the carpet 1 as indicated at step 52. In the case of the backer assembly 10', the reinforcement material 4' is sewn to the lower portion 14' of the carpet 1. As indicated at step 55, edges of the carpet 1, at the lower portion 14, are hemmed over the reinforcement material 4 or 4' to form the hemmed over portion 24. The elastic bands 5 or 5' are provided as indicated at 57. In particular, the elastic bands 5 or 5' are sewn to the lower edge of the lower portion 14, 14' as indicated 55. With this, the entire assembly 10 is completed and is attached to a vehicle seat structure 82 as indicated at step 60.

Figure 7B:
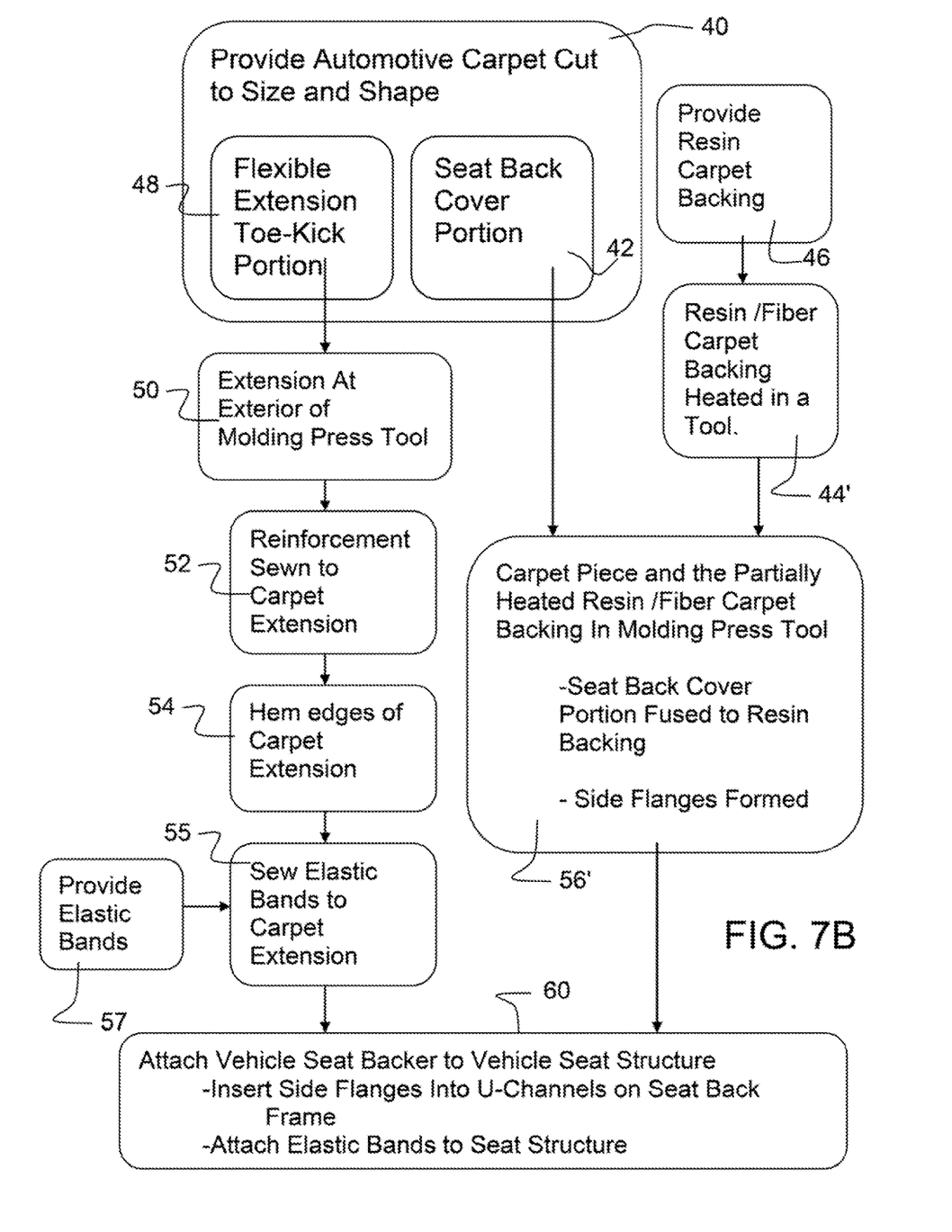
FIG. 7B is a flow diagram showing aspects of the method of forming a vehicle seat backer assembly according to another embodiment of the invention, in which a free portion of the carpet resin/fiber backing is formed.

FIG. 7B illustrates a slightly modified process to produce the backer assembly 10'. The method shown in FIG. 7B is essentially the same as the method shown in FIG. 7A except that at step 44', the resin/fiber panel material is only partially heated. In particular, the lower edge of the resin/fiber panel material is not heated. This will form the free edge 29. The resin/fiber panel material (the Azdel panel) is first heated in the tool at step 44' with the lower edge left out of a heating region so the lower edge of the resin/fiber panel material is not heated (Proto Process). Subsequently, the heated resin/fiber panel material and the upper portion of the carpet 1 are loaded together in mold press tool as indicated at step 56'. Once the tool is closed and pressed, the sized/cut resin/fiber panel material (the Azdel panel) and the upper portion 12' of the carpet 1, cut in the desired shape, are fused together. The portion of the backing panel 2' that is not heated does not adhere to the carpet (the lower edge of the resin/fiber panel material is not fused with the carpet material 1). This free edge 29 is not being formed as a pressed flat structure across the seat back. As an alternative production process, the heating of the backing panel 2' will be done in the forming tool (molding press tool), such that no pre heat is applied in a separate tool. In order to prevent adhesion in the lower edge (free edge) 29 of the resin/fiber panel material, and to be able to accommodate the push pin installation (plurality of push pins) 26, a spacer is loaded in the forming tool (molding press tool) between the carpet 1 and the resin/fiber backing material panel 2' and the carpet 1. The spacer will be removed after the composite resin/fiber panel material/carpet 1 is removed from the tool.

The attachment step 60 essentially includes inserting the side flange 20 into the U-channels 88 of the back panel 84 supported by the seat back frame 82. Additionally, the elastic bands 5 are attached to the structure at a lower portion of the seat structure 82.

FIG. 8 shows the vehicle seat 80 in an assembled state. The vehicle seat 80 includes the seat back 36 (also known as a backrest) and a seat cushion 38 (also known as a seat base). The vehicle seat 80 includes a backer assembly 10' according to the invention. As can be seen in FIG. 9, the backer assembly has an upper portion 12' which is rigid based on the carpet 1 being adhered (fused) to the backer material panel 2. A lower portion or toe-kick portion 14' is flexible. There is no backer material panel in this region, allowing the toe-kick portion 14' to move somewhat based on its flexible nature.

Figure 10:
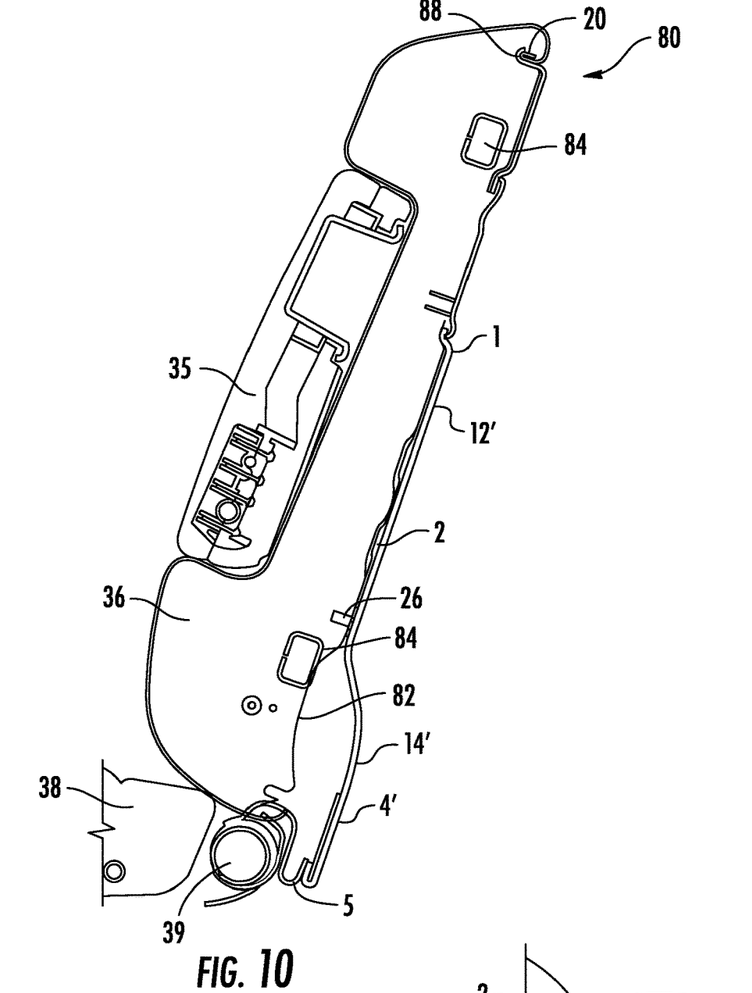
FIG. 10 is a sectional view taken along line X-X of FIG. 8.
Figure 11:
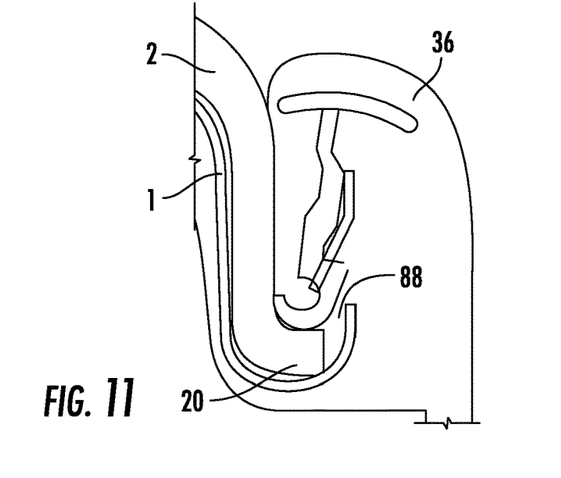
FIG. 11 is a sectional view taken along line XI-XI of FIG. 8.

FIG. 10 shows the vehicle seat 80 in cross-section. This shows the fixation of the upper flange edge 20 to upper U-channel 88. The view of FIG. 10 also shows the seat back 36 with the backrest frame structure 84 as well as an armrest 35, a portion of the seat cushion 38 and an ISO (International Organization for Standardization) tube 39. In the assembled state, cuffs 6 of the elastic straps 5' are attached to the iso tube 39. The essentially rigid upper portion 12' of the backer assembly 10' is fixed to the back panel 82 of the backrest 36. With this arrangement the flexible toe-kick portion 14' is able to move and within a range, based on the attachment of the upper portion 12' and the attachment of the bands 5' and cuffs 6 to the iso bar 39. FIG. 11 shows the attachment of a lateral (portion) flange 20 at a side (portion) of U-channel 88 of the backrest 36.

Figure 12:
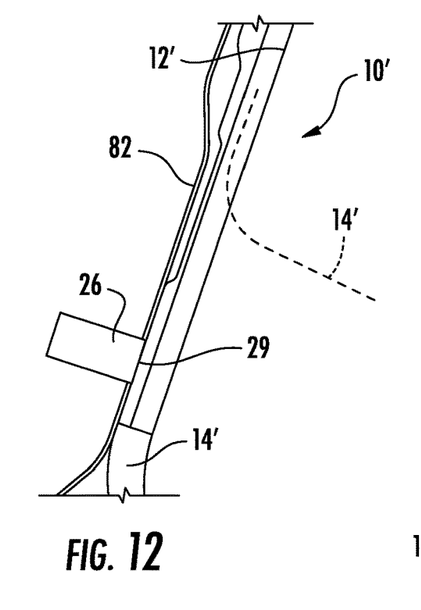
FIG. 12 is a schematic side view showing the free portion of the resin/fiber material, which allows the carpet to lift up for push trim attachment.
Figure 13:
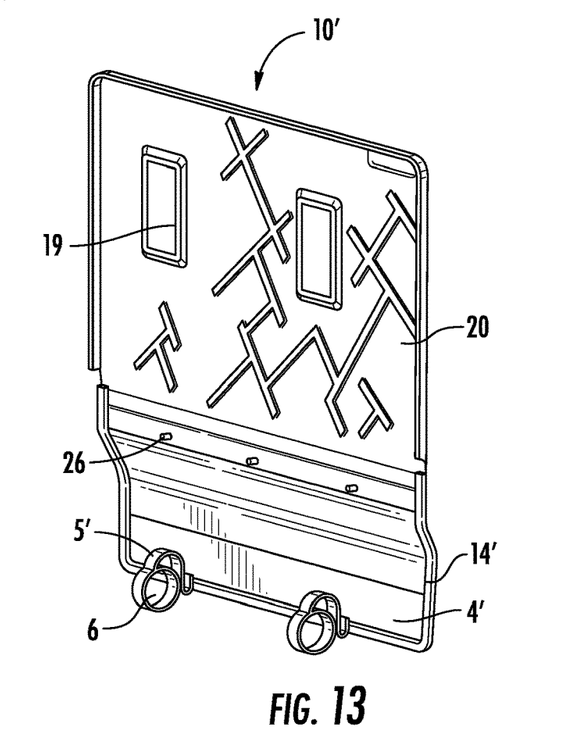
FIG. 13 is a schematic perspective view showing the backer assembly ready for assembly with the seat back frame and/or back panel.
Figure 14:
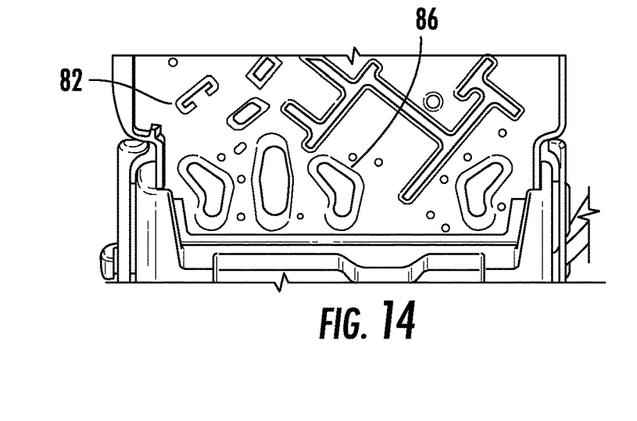
FIG. 14 is a schematic rear view showing the seat back frame and/or back panel before assembly with the backer assembly.

FIG. 13 shows an inner side of the backer assembly 10', prior to assembly, to further illustrate the assembly process of the vehicle seat 80. After adding back foam/trim assembly to the frame structure 82/84 the backer assembly number 10' is applied. This includes positioning the peripheral flange 20, of carpet and backer 10', into the retaining U-channel 88. This can be appreciated from the cross-sectional view of FIGS. 10 and 11. FIG. 12 illustrates the subsequent movement of the lower portion 14' of the carpet 1. After the upper portion 12' with the molded carpet 1 and pressed backer material 2 is attached to the back panel 82 with the flange 20 inserted into U-channel 88, the lower portion 14' of the carpet 1 is lifted to install the push pins 26 in push pin receiving openings 86, provided in the back panel 82. The cuffs 6 of the elastic straps 5' are then wrapped around the isofix tube. The push pin installation may be a manual process.

While specific embodiments of the invention have been shown and described in detail to illustrate the application of the principles of the invention, it will be understood that the invention may be embodied otherwise without departing from such principles.

LIST OF REFERENCE CHARACTERS

1 Automotive carpet (Eudora 19 oz) piece
2 the resin/fiber, upper carpet, panel portion
3 flange staked to carpet backing
4 polypropylene reinforcement
5 elastic bands for attachment to seat structure
10 vehicle seat backer assembly
10' vehicle seat backer assembly
12 upper carpet portion
12' upper carpet portion
14 lower carpet portion
14' lower carpet portion
16 contour portion
18 contour portion
19 cut out opening
20 perimeter flange
22 back panel surface
24 hemmed over carpet edges
26 push pin installation
28 end of fused connection
29 free edge of backing material
34 press tool
35 arm rest
36 seat back (backrest)
38 seat cushion (seat base)
39 ISO tube
40 Provide Automotive Carpet
42 Seat back cover portion provided
44 Carpet Piece and Resin backing in Molding Press
46 Resin carpet backing provided
48 Flexible Extension Portion provided
50 Extension portion positioned outside of Molding Press
52 Bonding reinforcement to Carpet Extension
54 Hem edges of lower carpet portion
55 Sew elastic bands to carpet extension
56 position and press mold with molding press
56' position and press mold with molding press
57 provide elastic Bands
58 sew on elastic bands
60 Attach seat backer to vehicle seat
80 vehicle seat
82 seat back panel
84 seat back frame
86 push pin openings
88 U-channel

What is claimed is:

1. A vehicle seat carpet backer assembly comprising:
a carpet piece with a predefined carpet perimeter contour and comprising an upper carpet portion and a lower carpet portion; and
a resin/fiber material, the upper carpet portion and the resin/fiber material being joined and molded to form a resin/fiber, upper carpet, panel portion of a defined shape, wherein the lower carpet portion is not joined with the resin/fiber material and forms a flexible toe-kick portion with a seamless transition between the upper carpet portion of the resin/fiber, upper carpet, panel portion and the lower carpet portion of the flexible toe-kick portion, wherein the resin/fiber, upper carpet, panel portion of the defined shape is formed by at least partially heating the resin/fiber material and molding at least a portion of the heated resin/fiber material together with the upper carpet portion to press together and fuse together at least a portion of the heated resin/fiber material and the upper carpet portion.

2. A vehicle seat carpet backer assembly according to claim 1, wherein the resin/fiber, upper carpet, panel portion includes an at least semi ridged back panel surface and an at least semi ridged outer flange extending along at least a portion of an outer perimeter of the back panel surface and extending away from the back panel surface.

3. A vehicle seat carpet backer assembly according to claim 1, further comprising a flexible carpet reinforcement, wherein the flexible carpet reinforcement is connected to the lower carpet portion to form a reinforcement backing for the flexible toe-kick portion.

4. A vehicle seat carpet backer assembly according to claim 3, wherein the flexible carpet reinforcement comprises polypropylene reinforcement material sewn to an inner surface of the lower carpet portion.

5. A vehicle seat carpet backer assembly according to claim 3, wherein edges of the lower carpet portion are hemmed over the flexible carpet reinforcement to provide a hemmed over portion sewn to the flexible carpet reinforcement and sewn to a front side of the carpet piece.

6. A vehicle seat carpet backer assembly according to claim 1, further comprising elastic bands sewn to a lower edge of the flexible lower carpet portion.

7. A vehicle seat carpet backer assembly according to claim 1, further comprising push pins fixed adjacent to a lower edge of the resin/fiber material.

8. A vehicle seat carpet backer assembly according to claim 7, wherein the lower edge of the resin/fiber material is not fused to the upper carpet portion in a region of the push pins, whereby the not fused resin/fiber material forms a backing material free edge.

9. A vehicle seat carpet backer assembly according to claim 1, further comprising a flange element staked to a lower edge of the resin/fiber material.

10. A vehicle seat comprising:
a vehicle seat back frame and/or back panel; and
a carpet backer assembly comprising:
   a carpet piece with a predefined carpet perimeter contour and comprising an upper carpet portion and a lower carpet portion; and
   a resin/fiber material, the upper carpet portion and the resin/fiber material being joined and molded to form a resin/fiber, upper carpet, panel portion of a defined shape, wherein the lower carpet portion is not joined with the resin/fiber material and forms a flexible toe-kick portion with a seamless transition between the upper carpet portion of the resin/fiber, upper carpet, panel portion and the lower carpet portion of the flexible toe-kick portion, wherein the resin/fiber, upper carpet, panel portion of the defined shape is formed by at least partially heating the resin/fiber material and molding at least a portion of the heated resin/fiber material together with the upper carpet to press together and fuse together at least a portion of the heated resin/fiber material and the upper carpet portion.

11. A vehicle seat according to claim 10, wherein:
the vehicle seat back frame and/or back panel comprises a peripheral channel;
the resin/fiber, upper carpet, panel portion includes an at least semi ridged back panel surface and an at least semi ridged outer flange extending along at least a portion of an outer perimeter of the back panel surface and extending away from the back panel surface;
the peripheral channel receives the rigid outer flange to position the vehicle seat carpet seat backer assembly relative to the vehicle seat back frame and/or back panel.

12. A vehicle seat according to claim 11, wherein:
push pins are fixed adjacent to a lower edge of the resin/fiber material; and
the vehicle seat back frame and/or back panel comprises push pin openings receiving the push pins fixed adjacent to a lower edge of the resin/fiber backer panel.

13. A method comprising the steps of:
providing carpet piece having a predetermined size and shape;
providing a resin/fiber panel material having a predetermined size and shape;
heating at least a portion of the resin/fiber panel material;
placing at least an upper carpet portion of the carpet piece along with at least a portion of the heated resin/fiber panel material in a molding press and, with the molding press, pressing a backside of the carpet piece to the resin/fiber panel material in the molding press to form a resin/fiber, upper carpet, panel portion of a defined shape; and
removing the resin/fiber, upper carpet, panel portion from the molding press.

14. A method according to claim 13, wherein the molding press includes a molding tool forming the resin/fiber, upper carpet, panel portion with a back panel surface and a rigid outer flange extending along at least a portion of an outer perimeter of the resin/fiber, upper carpet, panel portion and extending away from the back panel surface.

15. A method according to claim 14, further comprising:
providing a vehicle seat back frame and/or back panel comprising a peripheral channel;
placing the rigid outer flange in the peripheral channel extending along at least a portion of an outer perimeter of the resin/fiber, upper carpet, panel portion to position the vehicle seat carpet seat backer assembly relative to the vehicle seat back frame and/or back panel.

16. A method of forming a vehicle seat according to claim 15, wherein:
the lower edge of the resin/fiber material is not fused to the upper carpet portion, whereby a backing material free edge is formed;
fixing push pins to the backing material free edge;
providing the vehicle seat back frame and/or back panel with push pin openings; and
pushing the push pins into the push pin openings.

17. A method according to claim 13, wherein a lower carpet portion of the carpet piece is not placed in the molding press such that the lower carpet portion is flexible and is not fused to the resin/fiber material and further comprising the step of providing a flexible carpet reinforcement and attaching the flexible carpet reinforcement to the lower carpet portion to form reinforced flexible lower carpet portion.

18. A method according to claim 17, wherein the flexible carpet reinforcement comprises polypropylene reinforcement material fixed to an inner surface of the carpet piece and further comprising hemming edges of the lower carpet portion over the backing to form a hemmed over portion that is sewn to the backing and to a front side of the carpet piece.

19. A method according to claim 17, further comprising the steps of:
providing elastic bands; and
sewing the elastic bands to a lower edge of the flexible lower carpet portion.

20. A method according to claim 13, further comprising the step of providing a flange element staked to a lower edge of the resin/fiber material.

\* \* \* \* \*